July 11, 1950  F. M. GUY  2,515,001
UNIVERSAL JOINT
Filed Oct. 9, 1946
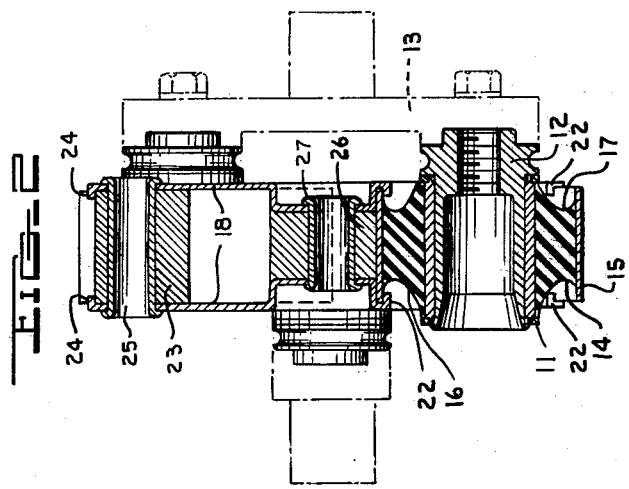
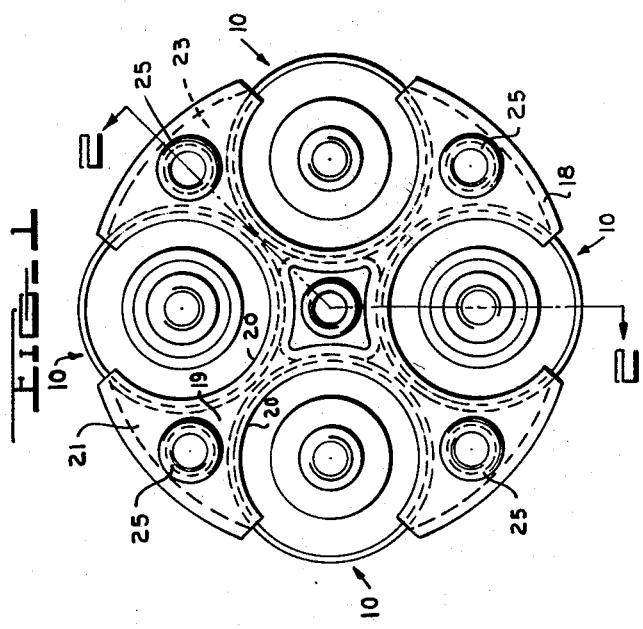
INVENTOR.
FREDERICK M. GUY
BY
Arthur M. Smith
ATTORNEY Patented July 11, 1950

2,515,001

UNITED STATES PATENT OFFICE 2,515,001

UNIVERSAL JOINT

Frederick M. Guy, Detroit, Mich., assignor to Guy & Murton, Inc., Detroit, Mich., a corporation of Michigan Application October 9, 1946, Serial No. 702,239

9 Claims. (Cl. 64—11)

The present invention relates to a universal joint or flexible coupling and more particularly to such joint or coupling in which resilient elements are interposed between the driving and driven shaft to provide a resilient driving connection.

The present invention is an improvement upon the universal joint construction shown in my issued Patents Nos. 1,978,939, dated October 30, 1934, and 2,195,647, dated April 2, 1940.

An object of the present invention is to provide an improved universal joint or flexible coupling in which resilient bushings are interposed between the driving and driven shaft connection to provide for the parallel, angular and longitudinal misalignments of the connected shafts and to provide a yielding but positive connection between the shafts and in which irregularities in the transmitted torque loads are cushioned to provide a smooth flow of power through the joint or coupling with a minimum amount of power loss.

It is a further object of the present invention to provide an improved universal joint or flexible coupling in which all metal to metal contacts between the driving and driven shaft connections are eliminated, thus providing a joint or coupling which is quiet in its operation, is not affected by dirt or grit and which does not require lubrication.

It is a further object of the present invention to provide an improved universal joint or flexible coupling in which all parts are centralized in a unitary carrier to provide a joint or coupling of balanced construction which runs true without friction or backlash during its operation, the design of the carrier and the resilient drive member mounted therein permitting the economical manufacture of the joint or coupling by mass production methods within rather broad tolerance limits.

It is a further object of the present invention to provide an improved universal joint or flexible coupling in which the construction of the carrier permits the ready installation or removal of the joint or coupling between the driving and driven flanges attached respectively to the driving and driven shafts and in which, because of its design and construction, the size and weight of the carrier member is held to a minimum for the load capacity of the joint or coupling.

It is a further object of the present invention to provide an improved universal joint or flexible coupling in which the carrier member having a plurality of separate resilient bushings is so constructed that both the weight and the size thereof may be reduced without reducing the capacity of the joint or coupling.

Other objects of this invention will appear in the following description and appended claims, reference being had to the accompanying drawings forming a part of this specification wherein like reference characters designate corresponding parts in the several views.

In the drawings:

Fig. 1 is a plan view of the central carrier member and resilient bushing of a universal joint or flexible coupling embodying the present invention.

Fig. 2 is a section taken substantially on the line 2—2 in the direction of the arrows, Fig. 1, showing the carrier member of Fig. 1 connected to driving and driven shaft flanges here shown in dotted lines.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The construction here shown includes a plurality of resilient bushings 10, in the present instance four in number. As here shown the driving member is attached on one side of the carrier to one opposed pair of the said resilient bushings and the driven member is attached on the opposite side of the carrier to the opposite pair of said bushings. The resilient bushings 10 are arranged in a symmetrical cluster with the circumferential edge portions of the bushings in contact with each other. Each of the resilient bushings 10, as best shown in Fig. 2, include a centrally located core 11, here shown as a rigid core of the spaced cylindrical rod type as more fully shown and described in my co-pending application Serial No. 702,241, filed Oct. 9, 1946, now Patent Number 2,505,766 issued May 5, 1950. However, the core 11 may be of any other suitable construction which will permit a positive mechanical connection between it and a connector stud 12 which is adapted to be connected with either the driving or the driven member such, for example, as a flange member 13, shown in dotted line in Fig. 2. An annular body 14 of resilient material, such, for example, as natural or synthetic rubber, or a blend thereof, is secured to the centrally located core 11 and is provided with a circumferential shell portion 15 preferably formed of steel or the like rigid material to which the body of resilient material 14 is secured as by bonding. Annular grooves 16 and 17 are formed in opposite faces of the annular body of resilient material 14 and are concentric with the core 11 and the shell 15.

The plurality of resilient bushings 10 are held in position in the assembly and the driving torque is transmitted from one pair of bushings 10 to the other pair thereof by a rigid carrier plate and spacer assembly which, as here shown, comprises a pair of spaced identical metal stampings 18, one forming the top and one forming the bottom of the carrier plate assembly. Each of the stampings 18 is provided with a plurality of radially disposed symmetrically spaced arms 19. Each of the said arms 19 is provided with oppositely curved arcuate edges 20 which terminate in an enlarged end portion 21 which is curved to provide a segment of the circumferential edge portion of the bushing assembly which lies on a curved line generated by a radius which extends from the center of the bushing assembly to the most distant point outwardly therefrom lying on the shell portion 15 of the resilient bushings 10.

The oppositely curved arcuate edges 20 of each pair of arms 19 are of a suitable size and shape to overlie a portion of the circumferential shell 15 of one of the resilient bushings 10 and are provided with an inwardly extending flange portion 22 which overlies and engages a portion of the edge of the circumferential shell 15 of each of the bushings 10 to hold said bushings in the assembly.

The stampings 18 are held in spaced relation to each other by a plurality of curve face wedge members 23, preferably formed of an aluminum alloy or other lightweight metal or alloy, the apices of which extend between the shells 11 of each pair of resilient bushings 10 and thus act to assist in holding the bushings 10 in predetermined positions in the carrier assembly.

The wedge members 23 each have a curved base portion which underlies the enlarged end portion 21 of the radially disposed arms 19. Inturned flanges 24 are provided on the enlarged end portions 21 of the radially disposed arms 19 and engage the curved base portion of each of the wedge members 23 to hold them in the assembly.

The stampings 18 are secured in their assembled positions by a plurality of eyelets 25. One eyelet 25 extends through each one of the wedge members 23. The ends of the eyelets 25 are turned or riveted over the external surfaces of the stampings 18 to draw the stampings 18 into tight surface contact with the surfaces of the wedge members 23 and with the edges of the shell portions 15 of the resilient bushings 10.

The central portion of each of the stampings 18 is pressed inwardly and contacts the face portions of the central spacer 26 which is disposed between them. The central spacer 26 is preferably formed of an aluminum alloy or other lightweight metal or metallic alloy. A central eyelet 27 extends through the spacer 26 and through the stampings 18 and has its end portions turned or riveted over the external surfaces of the central portions of the stampings 18.

The central spacer 26 is formed with curved side portions conforming to the curvature of the shells 15 of the resilient bushings 10. The curved side portions of the central spacer 26 engage with a portion of the shells 15 of the resilient bushings 10 to support the bushings 10 against movement toward the center of the assembly.

In the present embodiment I have shown the driving and driven member connected to opposite pairs of resilient bushings 10. It is to be understood, however, that one of said members may be connected with the stampings 18 at one side by connection with the plurality of eyelets 25, in which instance, the other of said members may be connected at the opposite side with the cores 11 of all of the resilient bushings 10. In the event that a pilot member is desired, the pilot may engage the central eyelet 27.

From the foregoing, it will be seen that I have provided a resilient coupling construction in which the weight of the carrier and of the spacer assembly has been held to the minimum by the provision of the identical metal stampings 18 in which the amount of metal and the weight has been reduced to a minimum because of their skeletal design. Formation of the spacer members 23 and 26 of an aluminum alloy or other lightweight metal or alloy also reduces the weight of the assembly. These reductions in weight are particularly important where a resilient coupling or joint is to be operated at high speeds of rotation or where, because of intermittent stopping and starting of the connected members, the inertia effect of the coupling or joint is important.

While I have shown the use of four resilient bushings in the present embodiment, it is to be understood that other numerical combinations of bushings may be provided within the scope of the present invention. Where other numerical combinations of resilient bushings are utilized, it will be understood that the shape and number of the radial arms likewise will be modified and that the number and shape of the spacer members likewise will be changed to accommodate the changed number of such resilient bushings.

I claim:

1. A resilient torque transmitting coupling comprising a plurality of resilient bushings each having a rigid circumferential shell, a central core and a resilient body portion secured between said shell and core, and a carrier for said bushings comprising a pair of identical spaced skeletal stampings disposed around and partially overlying opposite faces of said bushings and having inturned gripping flanges engaging a portion of the outer edge of said circumferential shells.

2. A resilient torque transmitting coupling comprising a plurality of resilient bushings each having a rigid circumferential shell, a central core and a resilient body portion secured between said shell and core, and a carrier for said bushings comprising a pair of identical stampings secured in spaced relation to each other and having inturned flange portions overlying and engaging a portion of the edges of the rigid circumferential shells of said plurality of resilient bushings, and lightweight metallic spacers disposed between said stampings and the shell portions of adjacent resilient bushings to space said stampings and locate said bushings.

3. A resilient torque transmitting coupling comprising a plurality of resilient bushings each having a rigid circumferential shell, a central core and a resilient body portion secured between said shell and said core, and a carrier for said bushings comprising a pair of identical spaced skeletal stampings each comprising a plurality of symmetrically disposed radial arms terminating in a curved end portion, an inturned flange extending in a curved path along the sides of each pair of said arms and adapted to overlie and engage a portion of an edge of the circumferential shell of one of said plurality of resilient bushings.

4. A resilient torque transmitting coupling comprising a plurality of resilient bushings each having a rigid circumferential shell, a central core and a resilient body portion secured between said shell and said core, and a carrier for said bushings comprising a pair of identical stampings each comprising a plurality of symmetrically disposed radial arms terminating in a curved end portion, an inturned flange extending in a curved path along the sides of each pair of said arms and adapted to overlie and engage a portion of the circumferential shell of one of said plurality of resilient bushings, and lightweight metallic spacers disposed between said stampings and the shell portions of adjacent resilient bushings to provide the spacing for said stampings and a locating support for said bushings.

5. A resilient torque transmitting coupling comprising a plurality of resilient bushings each having a rigid circumferential shell, a central core and a resilient body portion secured between said shell and said core, and a carrier for said bushings comprising a pair of identical spaced skeletal stampings each comprising a plurality of symmetrically disposed radial arms terminating in a curved end portion, an inturned flange extending in a curved path along the sides of each pair of said arms and adapted to overlie and engage a portion of the edge of the circumferential shell of one of said plurality of resilient bushings, and an inturned flange extending along each of the curved end portions of said radial arms.

6. A resilient torque transmitting coupling comprising a plurality of resilient bushings each having a rigid circumferential shell, a central core and a resilient body portion secured between said shell and said core, and a carrier for said bushings comprising a pair of identical stampings each comprising a plurality of symmetrically disposed radial arms terminating in a curved end portion, an inturned flange extending in a curved path along the sides of each pair of said arms and adapted to overlie and engage a portion of the circumferential shell of one of said plurality of resilient bushings, and lightweight metallic spacers disposed between said stampings and the shell portions of adjacent resilient bushings to provide the spacing for said stampings and a locating support for said bushings, and an inturned flange extending along each of the curved end portions of said radial arms and adapted to engage a portion of said spacers and prevent displacement thereof.

7. A resilient torque transmitting coupling comprising a plurality of resilient bushings each having a rigid circumferential shell, a central core and a resilient body portion secured between said shell and core, and a carrier for said bushings comprising a pair of identical stampings secured in spaced relation to each other and having inturned flange portions overlying and engaging a portion of the edges of said rigid circumferential shells of said plurality of resilient bushings, and lightweight metallic spacers disposed between said stampings and the shell portions of adjacent resilient bushings to provide the spacing for said stampings and a locating support for said bushings, and a plurality of eyelets each extending through said stampings and one of said spacers and having overturned end portions for holding said parts in assembled positions.

8. A resilient torque transmitting coupling comprising a plurality of resilient bushings each having a rigid circumferential shell, a central core and a resilient body portion secured between said shell and said core, and a carrier for said bushings comprising a pair of identical stampings each comprising a plurality of symmetrically disposed radial arms terminating in a curved end portion, an inturned flange extending in a curved path along the sides of each pair of said arms and adapted to overlie and engage a portion of the circumferential shell of one of said plurality of resilient bushings, and lightweight metallic spacers disposed between said stampings and the shell portions of adjacent resilient bushings to provide the spacing for said stampings and a locating support for said bushings, and a plurality of eyelets each extending through said stampings and one of said spacers and having overturned end portions for holding said parts in assembled positions.

9. A resilient torque transmitting coupling comprising a plurality of resilient bushings each having a rigid circumferential shell, a central core and a resilient body portion secured between said shell and said core, and a carrier for said bushings comprising a pair of identical stampings each comprising a plurality of symmetrically disposed radial arms terminating in a curved end portion, an inturned flange extending in a curved path along the sides of each pair of said arms and adapted to overlie and engage a portion of the circumferential shell of one of said plurality of resilient bushings, lightweight metallic spacers disposed between said stampings and the shell portions of adjacent resilient bushings to provide the spacing for said stampings and a locating support for said bushings, an inturned flange extending along each of the curved end portions of said radial arms and adapted to engage a portion of said spacers and prevent displacement thereof, and a plurality of eyelets, each extending through said stampings and one of said spacers and having overturned end portions for holding said parts in their assembled positions.

FREDERICK M. GUY.

REFERENCES CITED

The following references are of record in the file of this patent:

UNITED STATES PATENTS

| Number | Name | Date |
|---|---|---|
| 2,377,468 | Vanditty | June 5, 1945 |